Jan. 24, 1961 J. A. NEWTON Re. 24,928

VALVE RETAINER LOCK AND METHOD OF MAKING SAME

Original Filed April 5, 1955

Inventor
JOHN A. NEWTON by Hill, Sherman, Meroni, Gross & Simpson Attys.

United States Patent Office

Re. 24,928
Reissued Jan. 24, 1961

24,928

VALVE RETAINER LOCK AND METHOD OF MAKING SAME

John A. Newton, Gates Mills, Ohio, assignor to Thompson Ramo Wooldridge Inc., a corporation of Ohio Original No. 2,827,031, dated Mar. 18, 1958, Ser. No. 499,366, Apr. 5, 1955. Application for reissue July 29, 1959, Ser. No. 830,442

12 Claims. (Cl. 123—188)

Matter enclosed in heavy brackets [ ] appears in the original patent but forms no part of this reissue specification; matter printed in italics indicates the additions made by reissue.

The present invention is directed to valve spring retainer locks of the type employed in conjunction with poppet valves in internal combustion engines.

In conventional poppet valve assemblies the poppet valve stem is provided with one or more peripheral grooves near the tip end thereof for receiving ribs or beads of valve spring retainer locks. The latter usually consist of a pair of mating semi-circular segments having frusto-conical outer faces and cylindrical inner faces provided with ribs, beads or other protuberances. The cylindrical inner faces surround the valve stem, the protuberances engage the grooves in the valve stem, and the conical outer faces have a wedge fit in the valve spring retainer.

Heretofore it has been common practise to provide a relatively tight radial fit between the interengaging ribs of the retainer lock and the grooves of the valve stem. As a result, no relative rotation could occur between the valve stem and the valve retainer. As a consequence, the valve always seated in substantially the same spot for each cycle of operation. This continued reseating in the same area encouraged a more rapid deterioration of the seating face and various valve rotators have been provided to overcome this deficiency. However, the addition of such devices increases the weight and expense of the valve assembly.

Accordingly, an object of the present invention is to provide a rotating poppet valve assembly which does not add any parts to a standard non-rotating assembly.

Another object of the present invention is to provide an improved valve spring retainer lock for poppet valves and the like which will accommodate rotation of the valve and which can be accurately shaped at low cost.

A further object of the invention is to provide an improved method for shaping and forming valve retainer locks for poppet valves and similar devices.

A still further object is to provide a method of coining ribbed members without damaging the coining dies.

Further objects and features of the present invention will be apparent to those skilled in the art from the following description of the accompanying sheet of drawings, which illustrate a preferred embodiment of the invention.

Figure 1:
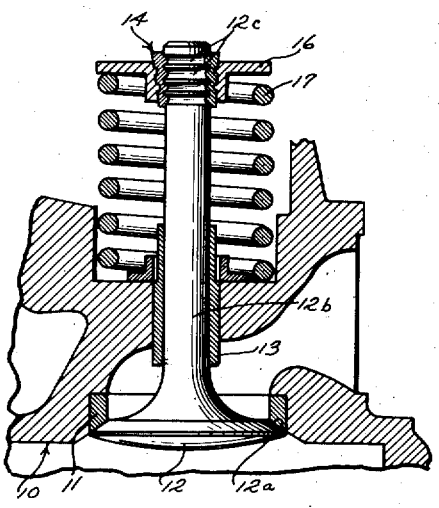
Figure 1 is a fragmentary view in elevation, and partially in cross-section, of a poppet valve assembly equipped with a valve retainer lock according to the present invention.

In Figure 1, reference numeral 10 indicates generally an engine part such as, for example, a portion of the cylinder head of an internal combustion engine. Seated within an appropriate recess in the cylinder head 10 is an annular valve seat insert 11 composed of a material capable of withstanding the high temperatures and corrosive conditions to which the valve assembly is subjected. A poppet valve 12 has a tapered seating face 12a seated against the valve seat insert ring 11 and a rod-like stem portion 12b slidably received within a valve stem guide 13.

One end of the stem portion 12b includes a plurality of conventional retainer lock grooves 12c which cooperate in a manner to be henceforth described with a valve retainer lock generally indicated at numeral 14. A valve spring retainer 16 is provided about the retainer lock 14, and a coiled helical spring 17 having one end bottomed against the retainer 16 and the opposite end bottomed against the stationary portion of the cylinder head 10 resists opening movement of the valve, and returns the valve to its closed position.

Figure 3:
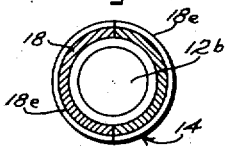
Figure 3 is a cross-sectional view taken along the line III—III of Figure 2.
Figure 5:
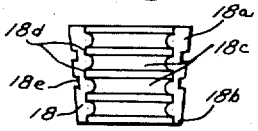
Figure 5 is a front elevational view of the retainer lock.

As best seen in Figures 3 and 5, the valve retainer lock 14 of the present invention consists of a pair of identical semi-circular segments 18, the segments 18 having semi-cylindrical inner faces and frusto conical outer faces thereby providing a larger diameter end 18a (Figure 5) tapering to a smaller diameter end 18b, the thickness of the wall decreasing gradually as the outer diameter of the segment decreases.

Figure 2:
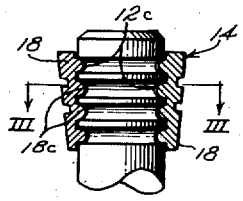
Figure 2 is a greatly enlarged, fragmentary view illustrating the manner in which the valve retainer lock cooperates with the valve stem.
Figure 4:
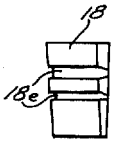
Figure 4 is a side elevational view of the retainer lock.

The inner face of each segment 18 is provided with a plurality of spaced semi-circular ribs 18c, the region between the ribs 18c consisting of semi-cylindrical lands 18d. The dimensions of the ribs 18c and the lands 18d are carefully correlated in order to achieve the best results. As illustrated best in Figure 2, the ribs 18c are received within the grooves 12c of the poppet valve 12 but are not seated at the base of the grooves and engage the grooves only along limited areas of contact when the two segments 18 are placed in abutting engagement. Hence, frictional resistance to relative rotation is minimized, so that relative rotation between the valve stem 12b and the valve spring retainer lock 14 is facilitated. Similarly, the base of the lands 18d are sufficiently deep so that they are spaced somewhat from the ridges 12c appearing between the grooves 12c of the valve stem, as illustrated in Figure 2. This, again, minimizes the areas of surface contact and consequently reduces the frictional binding effects which otherwise would occur between a valve stem and a valve retainer lock.

The outer surface of the segments making up the valve spring retainer lock 14 are also provided with relatively shallow grooves 18e which run in generally parallel relationship to the ribs 18c. The function of these grooves 18e will be apparent from the following description of the process used in the manufacture of the valve retainer lock.

Figure 6:
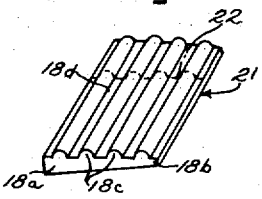
Figure 6 is a view in perspective of the strip stock from which the valve retainer locks are manufactured.

Most conveniently the fabrication of the assembly starts with the provision of a strip 21 of the type illustrated in Figure 6. The strip has the preformed ribs 18c separated by the lands 18d and varies in thickness from the end 18a to the end 18b.

Attempts to utilize a strip material of this type by cutting the strip to size, and then coining the resulting small pieces to obtain the proper dimensions have not always been successful. Experience has indicated that attempts to coin or otherwise shape the pieces into the required semicircular configuration frequently resulted in a great deal of tool breakage, and inability to maintain accurate dimensional control.

Figure 7:
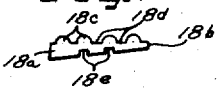
Figure 7 is a cross-sectional view of the strip stock after it has been notched or grooved according to the process of the present invention.

One of the features of the present invention resides in overcoming the previously noted defects in this type of process by providing the grooves 18e in generally parallel relationship to the ribs 18c, but on the opposite surface of the strip 21, as best illustrated in Figure 7 of the drawings. The grooves 18e can be conveniently provided in the strip 21 by simply milling the strip 21 before it is cut into the individual segments.

Figure 8:
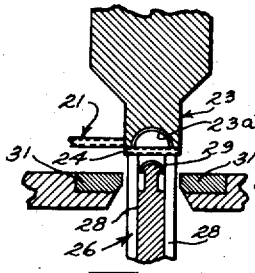
Figure 8 is a fragmentary, schematic view of a coining die assembly for shaping the retainer locks, the elements being shown in a position immediately prior to the initial coining step.
Figure 9:
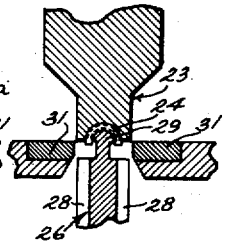
Figure 9 is a view similar to Figure 8, but illustrating the position of the coining elements during the coining.

After the grooves 18e have been cut into the surface of the strip 21, the strip is severed as indicated by the dotted line 22 in Figure 6 into a plurality of relative small small strips for the subsequent coining operation. This operation is best illustrated at Figures 8 of the drawings. As indicated in that figure, the strip 21 is severed into the required size by the action of an upper die member 23 having a forming cavity 23a therein. The strip 24 which results is locked between the upper die member 23 and a lower die member 26. The latter consist of a pair of opposed kicker fingers 28 which are movable vertically relative to a forming head 29. As the upper die member 23 moves downwardly, the strip 24 is bent around the forming head 29 into conformance with the cavity 23a.

Figure 10:
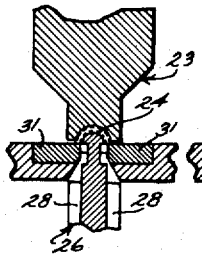
Figure 10 illustrates the die assembly after the edges of the piece have been severed.
Figure 11:
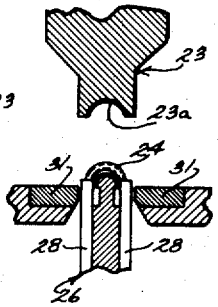
Figure 11 illustrates the piece after the completion of the coining operation; [and]
Figure 12:
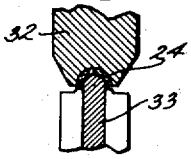
Figure 12 illustrates the final shaping operation[.]

The edges of the shaped strip 24 are then trimmed, as illustrated in Figure 10, by a pair of trim blades 31 which cut off the portions of the strip 24 projecting below the upper die member 23. Finally, as seen in Fig. 11, the upper die member 23 is disengaged from the strip 24, and the kicker fingers 28 eject the formed strip from the die.

The final step in the shaping consists in inserting the strip 24 into a shaping die consisting of an upper die member 32 and a lower punch member 33. The die member 32 and the punch member 33 are moved toward each other to shape the strip 24 to the semi-cylindrical form required.

*It will be noted that during these shaping operations a segmented annular collar is formed while the groove means 18e accommodate the flow of metal therein and thereby relieve some of the stresses on the shaping tools.*

Figure 13:
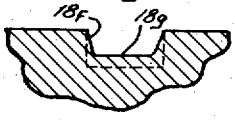
*Figure 13 is a greatly enlarged fragmentary view illustrating the manner in which some metal flow occurs during the shaping operation.*

*As best illustrated in Figure 13, which represents a greatly magnified showing, the grooves 18e are somewhat distorted during the metal shaping operation to accommodate the metal flow. The original configuration of the groove is illustrated by the dashed line showing, and the finished groove is depicted by the solid line showing. As shown, the metal movement causes the side walls 18f of the groove to become somewhat tapered, and to fill in the base 18g of the grooves with some displaced metal.*

It will be evident that various modifications can be made to the described embodiments without departing from the scope of the present invention.

I claim as my invention:

1. The method of forming a valve retainer lock which comprises providing a relatively flat strip having a plurality of spaced raised ribs on one face thereof, forming relieved areas in parallel relation to said ribs on the opposite face thereof, cutting said strip into relatively small pieces, and coining said pieces under sufficient pressure to cause some of the metal of said pieces to move into said relieved areas.

2. The method of forming a valve retainer lock which comprises providing a relatively flat strip having a plurality of spaced raised ribs on one face thereof, cutting longitudinally extending grooves in parallel relations to said ribs on the opposite face thereof, cutting said strip into relatively small pieces, and pressing said pieces under sufficient pressure to cause some of the metal of said pieces to move into said grooves.

3. A valve retainer lock comprising a pair of semicircular segments, each of said segments including inwardly extending ribs on the inner face thereof and relatively shallow grooves in spaced relation on the outer face thereof, said grooves accommodating the flow of metal during the shaping of said segments into semicircular form.

4. A valve retainer lock comprising a pair of semicircular segments, each of said segments being of gradually varying thickness and having inwardly extending ribs on the inner face thereof and relatively shallow grooves in spaced relation on the outer face thereof.

5. A valve retainer lock comprising a pair of semicircular segments, each of said segments being of gradually varying thickness and having inwardly extending ribs on the inner face thereof, and relatively shallow grooves on the outer face thereof, said grooves extending in generally parallel relationship to said ribs, and accommodating the flow of metal during the shaping of said segments into semi-circular form.

6. A poppet valve assembly comprising a poppet valve having a plurality of spaced retaining grooves, and a valve retainer lock comprising a pair of semi-circular segments having an alternate series of ribs and lands on their inner surfaces, said ribs being received in said retaining grooves, and the base of said segmental grooves being spaced from the portions of said valve between said retaining grooves, said segments also having a plurality of grooves on the outer surfaces thereof, accommodating the flow of metal during the shaping of said segments into semi-circular form.

*7. A valve retainer lock comprising a pair of semicircular segments, each of said segments including inwardly extending ribs on the inner face thereof and relatively shallow groove means on the outer face thereof, said groove means having metal therein by flow of said metal during the shaping of said segments into semi-circular form.*

*8. The method of forming a valve retainer lock which comprises providing a relatively flat strip having a plurality of spaced raised ribs on one face thereof, forming groove means on the opposite face thereof, cutting said strip into relatively small pieces, and coining said pieces under sufficient pressure to cause some of the metal of said pieces to move into said groove means.*

*9. A lock segment adapted to secure a valve spring retainer on a circumferentially grooved valve stem which comprises a segmental annular metal collar having a fragmental cylindrical inner wall with an inwardly extending transverse rib adapted to seat in the groove of a valve stem and a frusto conical outer wall adapted to wedge in a valve spring retainer, a transverse groove in said outer wall, and metal in said groove displaced from other areas of the collar.*

*10. A lock segment adapted for securing a valve spring retainer to a grooved valve stem which comprises a segmental annular metal collar having a ribbed inner wall adapted to embrace a valve stem with the ribbed portion seated in a stem groove and a grooved outer wall adapted*

*to seat in a spring retainer, and the grooved portion of said outer wall having metal therein displaced from collar metal outside of the groove.*

*11. The method of making a lock segment adapted to secure a valve spring retainer to a grooved valve stem which comprises providing a metal strip with a longitudinal rib projecting from one face and a longitudinal groove in the opposite face, die pressing the strip into fragmental annular collar shape with the rib projecting from the inner wall of the collar and the groove around the outer wall of the collar, and flowing metal into the groove during the die pressing operation to relieve stresses on the die.*

*12. The method of making a lock segment adapted to secure a valve spring retainer to a grooved valve stem which comprises providing a metal strip tapered in thickness from a thin edge to a thick opposite edge and having a rib on one face and a groove in the opposite face*

*between said edges, die pressing the strip into fragmental generally circular shape with the rib projecting from the inner wall and the groove in the outer wall of the shape, and flowing metal into the groove during said die pressing operation.*

References Cited in the file of this patent or the original patent

UNITED STATES PATENTS

| | | |
|---|---|---|
| 1,251,003 | Fornaca | Dec. 25, 1917 |
| 1,973,227 | Shoenrock | Sept. 11, 1934 |
| 2,037,838 | Van Uum et al. | Apr. 21, 1936 |

FOREIGN PATENTS

| | | |
|---|---|---|
| 130,994 | Australia | Jan. 17, 1949 |
| 425,651 | Italy | Oct. 10, 1947 |